US012196943B2

(12) United States Patent
Breckinridge

(10) Patent No.: US 12,196,943 B2
(45) Date of Patent: Jan. 14, 2025

(54) APERTURE DESIGNS TO MINIMIZE DIFFRACTION NOISE

(71) Applicant: Arizona Board of Regents on Behalf of the University of Arizona, Tucson, AZ (US)

(72) Inventor: James B. Breckinridge, Tucson, AZ (US)

(73) Assignee: Arizona Board of Regents on Behalf of the University of Arizona, Tucson, AZ (US)

(*) Notice: Subject to any disclaimer, the term of this patent is extended or adjusted under 35 U.S.C. 154(b) by 783 days.

(21) Appl. No.: 17/421,748

(22) PCT Filed: Jan. 9, 2020

(86) PCT No.: PCT/US2020/012870
§ 371 (c)(1),
(2) Date: Jul. 9, 2021

(87) PCT Pub. No.: WO2020/146588
PCT Pub. Date: Jul. 16, 2020

(65) Prior Publication Data
US 2022/0091409 A1    Mar. 24, 2022

Related U.S. Application Data

(60) Provisional application No. 62/790,255, filed on Jan. 9, 2019.

(51) Int. Cl.
*G02B 23/06*     (2006.01)
*G02B 5/09*      (2006.01)
*G02B 17/06*     (2006.01)

(52) U.S. Cl.
CPC ............... *G02B 23/06* (2013.01); *G02B 5/09* (2013.01); *G02B 17/06* (2013.01)

(58) Field of Classification Search
CPC .......... G02B 23/06; G02B 5/09; G02B 17/06
USPC ....................................................... 359/364
See application file for complete search history.

(56) References Cited

U.S. PATENT DOCUMENTS

| 4,904,073 A   | 2/1990 | Lawton et al. |
| 5,886,837 A * | 3/1999 | Legare ................. G02B 7/02 |
|               |        | 359/742 |
| 6,985,277 B2  | 1/2006 | Huibers et al. |
| 7,221,504 B2  | 5/2007 | Popil |

(Continued)

OTHER PUBLICATIONS

Farroukh Peykar Negar, Hans Jürgen Kärcher, Thomas Sure, Nicolas Perlot, "Design and Concepts for a 12m Optical Communication Antenna", IEEE International Conference on Space Optical Systems and Applications (ICSOS) 2017, pp. 99-107 (Year: 2017).*

(Continued)

*Primary Examiner* — Stephone B Allen
*Assistant Examiner* — Boutsikaris Leonidas
(74) *Attorney, Agent, or Firm* — Smith, Gambrell & Russell LLP

(57) ABSTRACT

An optical system comprising a segmented optical element comprising a plurality of segments disposed adjacent each other to define a pupil, wherein one or more of the plurality of segments comprises a pair of curved edges, wherein the segmented optical element is arranged such that a curved gap is defined between adjacent segments.

20 Claims, 17 Drawing Sheets

(56) References Cited

U.S. PATENT DOCUMENTS 10,809,517 B2* 10/2020 Johnson ............... G02B 27/286
2016/0097914 A1* 4/2016 Trail ....................... G01B 9/02
356/138

OTHER PUBLICATIONS

Harvey, et al.; "Novel Designs for minimizing diffraction effects of large segmented mirror telescopes"; Proc. SPIE 10745, Current Developments in Lens Design and Optical Engineering XIX; Sep. 17, 2018; retrieved on Sep. 3, 2020 from https://authors.library.caltech.edu/91930/1/107450L.pdf>; p. 107450L-1-107450L-14.
International Search Report and Written Opinion dated Mar. 20, 2020 for PCT Application No. PCT/US2020/012870; 7 pages.

* cited by examiner

Circular Pupil: No Obscuration, No Struts

D = 10m
$f$ = 20D

Color-coded PSF calculated by FRED.

Annular Pupil: No Struts.

D = 10m
$f$ = 20D
$\varepsilon$ = 0.16D

Color-coded PSF calculated by FRED.

APERTURE DESIGNS TO MINIMIZE DIFFRACTION NOISE

GOVERNMENT RIGHTS

The subject matter disclosed herein was made with government support under Grant No. NNX17AB29G, awarded by NASA. The Government has certain rights in the herein disclosed subject matter.

FIELD

Exemplary embodiments of the present disclosure relate generally to methods, and apparatuses for managing diffracted light in telescopes and/or imaging systems with segmented apertures.

BACKGROUND

Improvements in space telescope technology and other technologies such as adaptive optics are needed. For example, certain mirror systems may be heavy, costly, and may comprise transmission loss and reduction in light throughput. Direct imaging of terrestrial exoplanets is necessary if astronomers are to obtain detailed spectra of a planet's surface and atmosphere to characterize planetary evolutionary tracks and estimate the probability that the planet is capable of supporting life. The apparent angular separation between the exoplanet and its parent star is less than one-arc second. Exoplanets are much smaller in size than the parent star and shine in light reflected from that star and are therefore much fainter. The ratio of light from a terrestrial exo-planet to that of the star is between $10^{-10}$ and $10^{-11}$, depending on the size of the planet and the angular separation between the planet and its parent star.

Space telescope apertures of 6 to 30 meters are needed to provide the angular resolution and the radiation-gathering power to produce a significant statistical sample of terrestrial exoplanets for analysis. A telescope aperture of this size cannot be placed in orbit fully erected, rather mirror segments are either folded into a smaller volume (as was done for JWST) or in the future may be assembled in space. Therefore, space telescopes of 6 to 30-meter aperture will be partitioned into individual segments. To allow for deployment or assembly in space, the telescope aperture is divided up into separate mirrors with gaps between mirrors to produce a discontinuous concave surface. These gaps diffract light across the image plane. If these gaps form periodic linear structures across the aperture, then this diffracted light produces structured, unwanted radiation across the image to mask exoplanets.

The standard space telescope architecture today is that of a Cassegrain telescope, which has a secondary mirror supported by 4 or 3 structural beams that shadow the telescope aperture, as well as a hole on the primary mirror to allow light reflected from the secondary to pass thought and into a science instrument module. The NASA next generation large telescope architecture: Large UV Optical IR (LUVOIR) uses this Cassegrain telescope architecture, along with a primary mirror that is divided into regular hexagonal shaped segments. In this case, the telescope entrance pupil is discontinuous because of both the segment gaps and the secondary support structure shadows.

SUMMARY

In the present disclosure, by using curved structures for the secondary support system and curved sides to nest the segments one adjacent to the other across the primary mirror, the image plane "diffraction-noise" may be managed (minimized) by disrupting the diffraction pattern and creating a nearly uniform background across the image plane. Certain advantages of implementing this architecture may include: 1. Minimize the need for exotic and absorbing apodizing masks which control diffraction from segment gaps, 2. Increase exoplanet characterization data quality, 3. Improve radiometric calibration, 4. More accurate image restoration, since the point spread function (PSF) is both rotationally symmetric and isoplanatic over a FOV. Control of diffraction noise in the telescope may be effectuated using special mask or structured aperture or structured pupil, as described and shown herein. A so-called pinwheel pupil configuration is one example of a "structured pupil". But, other structures may be used.

The present disclosure relates to curving the segments of an optical element such as a lens or a primary mirror to control (minimize) diffraction "noise" across the image plane caused by the gaps. Such gaps may be created as needed to fold the mirror up for packaging into a smaller volume or for assembly in space or for large ground-based telescopes. However, other optical applications may be used and may benefit from the present disclosure.

Additional advantages will be set forth in part in the description which follows or may be learned by practice. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate embodiments and together with the description, serve to explain the principles of the methods and systems. The attached appendices are hereby incorporated by reference in their entirety.

DETAILED DESCRIPTION OF ILLUSTRATIVE EMBODIMENTS

Figure 1:
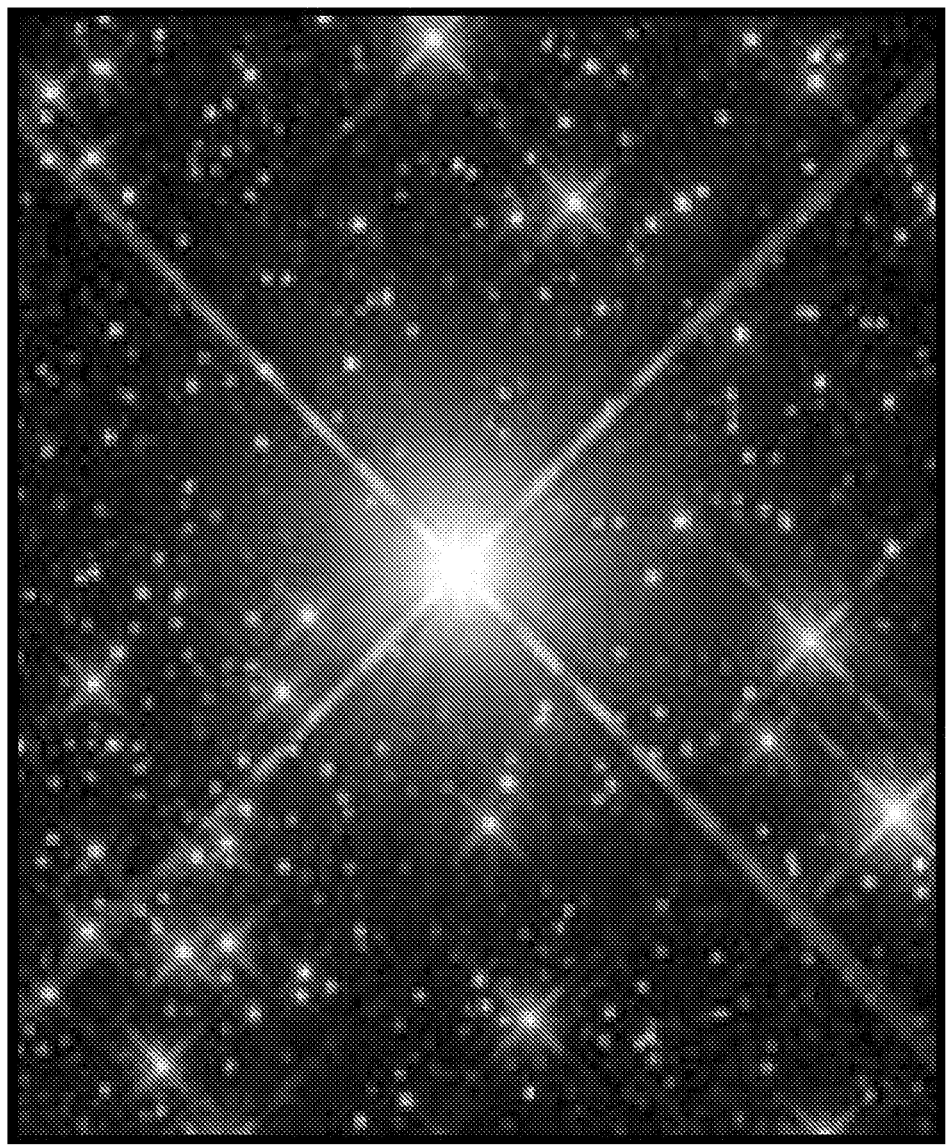
FIG. 1 shows an HST image of a star showing the diffraction spikes that mask exoplanets at 4 position angles. The halo around the star is produced in the telescope/instrument system by narrow angle scattered light. The Airy diffraction pattern for HST is about 100 milliarc seconds which is too large to image terrestrial exoplanets.

Some embodiments of the present disclosure will now be described more fully hereinafter with reference to the accompanying drawings, in which some, but not all embodiments of the present disclosure are shown. Indeed, various embodiments of the present disclosure may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the present disclosure. Moreover, the term "exemplary", as used herein, is not provided to convey any qualitative assessment, but instead merely to convey an illustration of an example. Thus, use of any such terms should not be taken to limit the spirit and scope of embodiments of the present disclosure.

It is to be understood that the methods and systems described herein are not limited to specific methods, specific components, or to particular implementations. It is also to be understood that the terminology used herein is for the purpose of describing particular embodiments only and is not intended to be limiting.

To identify terrestrial exoplanet in the FOV, the FOV location of an Earth twin is calculated at the distance of the parent star. Its's detectability may be determined by calculating the telescope aperture in meters needed to place the Earth twin at the first and third ring of the Airy diffraction pattern at the image plane. The contents of Table 1 identifies the location of terrestrial exoplanets and shows telescope apertures needed to record them. Note, the exoplanet is assumed as elongation in its orbit, a position the planet occupies only a short time. As an example, one should know the orbital details of exoplanet systems observed to maximize our probability of getting good spectra.

Table 1 Annular FOV location of Earth-twin terrestrial-exoplanets at elongation as a function of distance in parsecs is shown. Column 1 gives the distance from our solar system to a candidate exoplanet system. Column 2 shows the apparent angular separation between the primary star and its terrestrial exoplanet at elongation in its orbit. Column 3 presents the telescope aperture needed to just resolve this separation. Column 4 gives the telescope aperture needed to place the exoplanet at the third diffraction ring. In both cases the telescope apertures are calculated for 500-nm wavelength.

TABLE 1

| Distance Parsecs PC | Angle between star & Earth twin in milli-arc-sec | Aperture in meters Diffraction limited at 500 nm | Aperture in meters third Airy diffraction ring |
|---|---|---|---|
| 10 | 100.0 | 1.2 | 3.7 |
| 20 | 50.0 | 2.5 | 7.5 |
| 30 | 33.3 | 3.7 | 11.1 |
| 40 | 25.0 | 5.0 | 15.0 |
| 50 | 20.0 | 6.2 | 18.6 |
| 60 | 16.7 | 7.4 | 22.2 |
| 70 | 14.3 | 8.7 | 26.1 |
| 80 | 12.5 | 9.9 | 29.7 |
| 90 | 11.1 | 11.1 | 33.3 |
| 100 | 10.0 | 12.0 | 36.0 |

The Hipparcos catalog shows that there are 2347 stars with measured parallaxes of pi=33.33 mas, which correspond to a distance of 30 pc down to stellar magnitude V=8. (See Trunbull, M. C., FxoCat-1: The Nearby Stellar Systems Catalog for Exoplanet Imaging Missions, arXiv: 1510.01731[astroph. SR] arXiv:1510.01731 [astro-ph. SR] 2015). Exoplanets are ~$10^{10}$ fainter than their parent star. If the parent star has magnitude V=8, then the faintest terrestrial exoplanets within 30 pc will be between stellar magnitudes 31 and 34. For reference, the Hubble (2.4-m) ultra-deep field magnitude limit is ~29 and required an exposure of approximately $2*10^{+5}$ seconds. (See Beckwith, S. V. W.; M. Stailelli, A. M. Koekemoer, J. A. R. Calswell, et. al.; "The Hubble Ultra Deep Field" Astron. J. 132:1729-1755 (2006).

Ground and Space Telescopes

Discontinuous telescope pupils, that is telescope apertures that have some portion of the aperture blocked are responsible for diffraction "noise" at the image plane. Breckinridge, Kuper and Shack (1982) were the first to discuss the role of secondary support diffraction spikes in finding exoplanets. FIG. 1 below shows the diffraction pattern from the HST caused by the secondary support structure. Near the star one can see the "diffuse-light" effects of narrow angle scattered light. The sources of narrow angle scattered light in telescope/coronagraph systems were discussed by Pfister, R. N., Harvey, J. E. and J. B. Breckinridge, "The role of narrow angle forward surface scatter and particulate scatter in exoplanet exploration", Proc SPIE 10698-188, 2018.

Figure 2B:
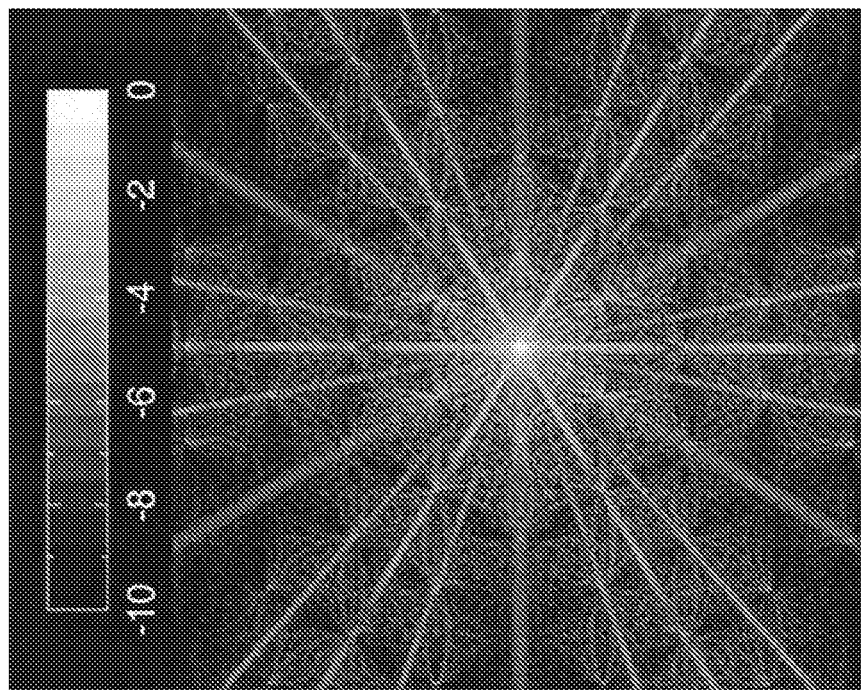
FIG. 2 shows a.) an illustration of the proposed 30-m diameter pupil of the ground-based CELT (now called the Thirty-meter telescope), complete with segmentation geometry, central obscuration and associated secondary mirror struts; b.) Monochromatic logarithmic PSF (lamda=1 micron) for this Image. The field of view is 1×1 arcsecond. Diffraction effects of the triangular central obscuration and the secondary mirror struts are readily apparent, as are the characteristic hexagonal symmetry of the mirror perimeter and the intersegment gaps.
Figure 2A:
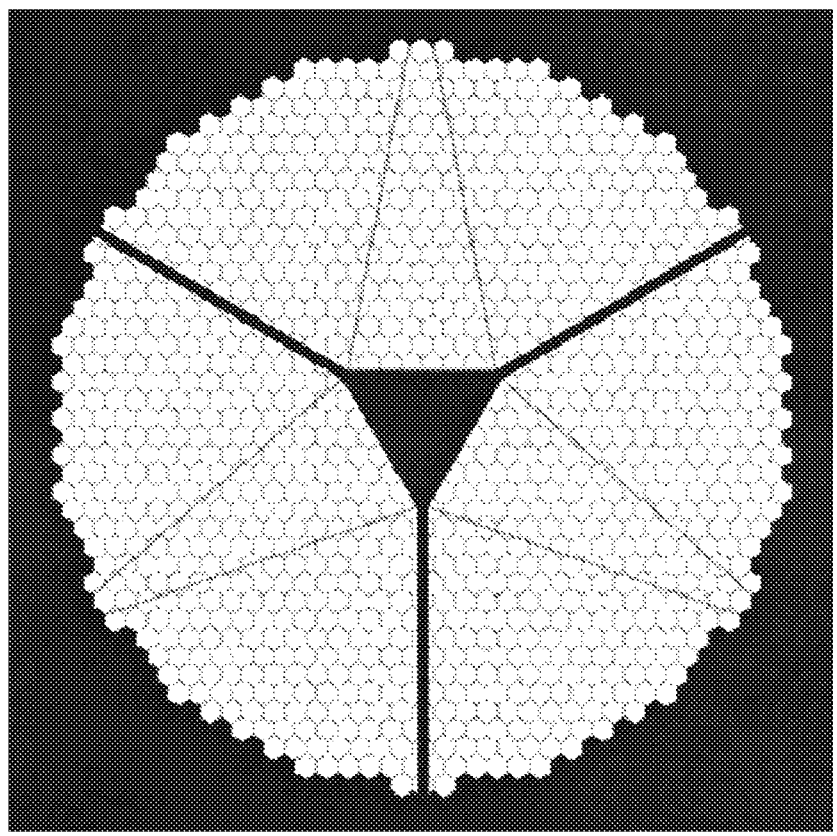

FIG. 2 shows the pupil, left and the irradiance at the image plane for an on-axis star at 1-micron wavelength for the 30-meter diameter CELT (now called the Thirty Meter Telescope, TMT) 7. The PSF is plotted on a $\log_{10}$ intensity scale and the grey scale across the top of the PSF image on the right shows intensity order of magnitude from $10^0$ to $10^{-10}$. The field of view is 1×1 arc-second. Light is scattered beyond 1 arc-second at intensities greater than $10^{-4}$ to obscure accurate exoplanet radiometric and spectral measurements. This scattered light is caused by the periodic structure across the telescope primary mirror produced by the close-packet hexagonal segments. A pupil architecture or topology may mitigate this prominent diffraction pattern science data quality and exoplanet yield will increase.

Segmented Space Telescope Diffraction

Figure 3:
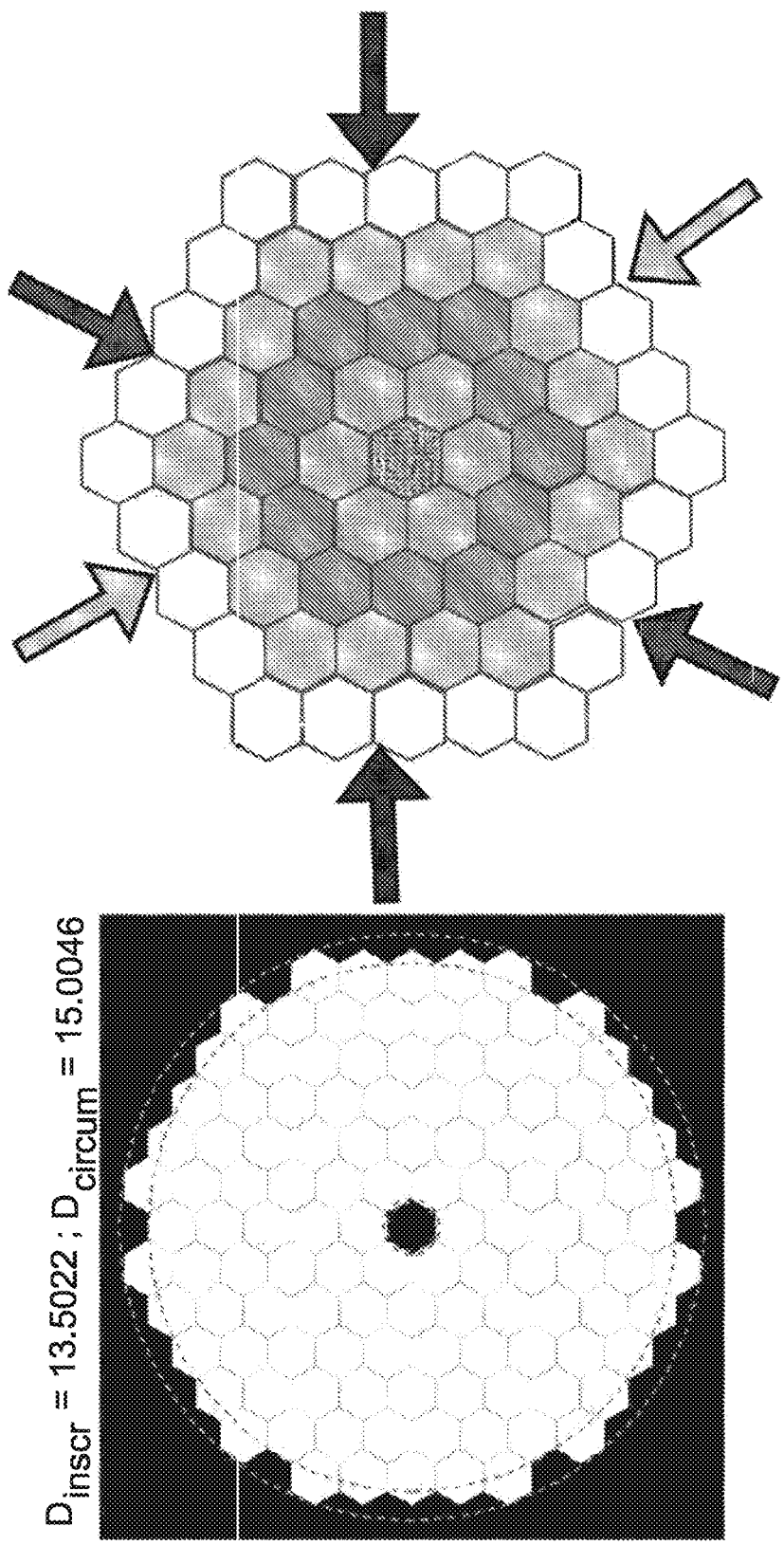
FIG. 3 shows a conventional space-based telescope (e.g., LUVOIR) pupil left and its partitioning into three linear diffraction gratings. The 3 "ruling" directions are clocked 60-degrees in relation to each other. The directions of the grating rulings are shown by the arrows.

Space telescopes that are segmented use close-packed regular hexagon-sided mirrors to pack into a nearly circular telescope pupil. FIG. 3 below shows, on the left, an example concept apertures and on the right is shown the individual segments of the primary. This telescope primary exhibits three diffraction gratings which diffract light from the much brighter star across the image plane and create background noise for imaging and spectroscopy of exoplanets. The direction of the "rulings" of the gratings are shown using red, blue and yellow arrows.

Figure 4:
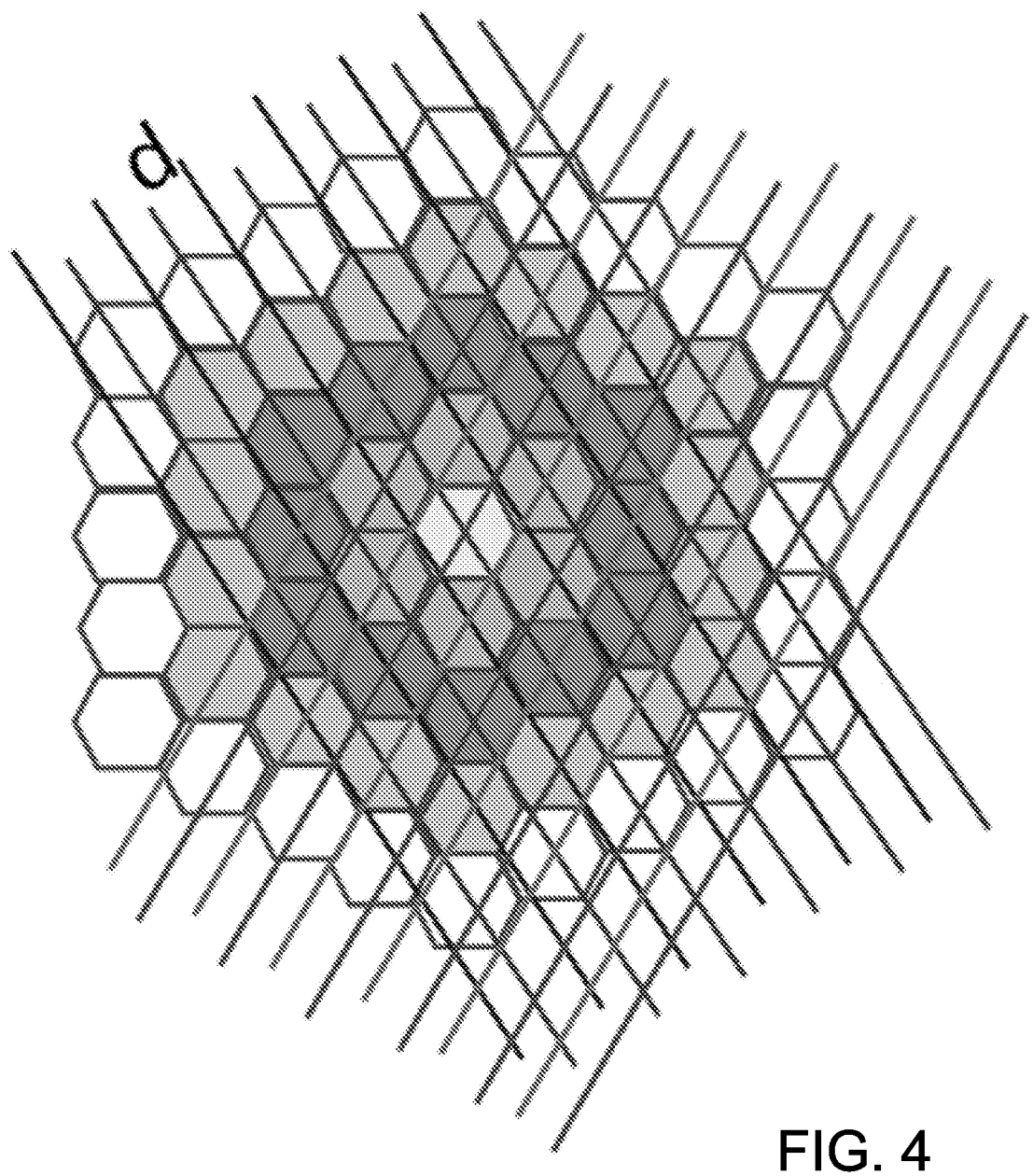
FIG. 4 shows two of the three diffraction gratings across the close-packed hexagon-segmented primary mirror are shown. The spacing of the "ruling" is d.

The rulings are discontinuous across the hexagonally segmented aperture pupil, but that does not make a difference to the diffractive properties of the straight lines. FIG. 4 shows 2 of the 3 sets of diffraction grating rulings across the hexagonally segmented pupil. The third set of rulings, the horizontal set are not show to avoid confusion in the drawing.

FIG. 4 shows the close-packed hexagon-segmented primary mirror with lines drawn to show the grating "rulings" and the direction of the rulings. The "groove-spacing" is seen to be d, where d is one-half the face-to-face distance across the individual regular hexagons. The diffraction causes a structured background across the image plane that may obscure important exoplanets and may introduce unwanted polarization aberrations into the coronagraph to affect image quality.

The PSF for a Monochromatic Star

Gratings diffract light into orders which map a single on-axis point (a monochromatic star, for example) into multiple images of that monochromatic star. If the source is polychromatic then the grating maps the polychromatic single on-axis point into multiple spectral images stretched out radially.

$$n\lambda = 2d\sin(\theta) \qquad \text{Eq 1}$$

or for very small angles we can write $$\theta = \frac{n\lambda}{2d}, \text{ where } \theta \text{ is in radians,}$$

The angular separation between diffraction orders is θ as given in Eq. 1 above.

Figure 5B:
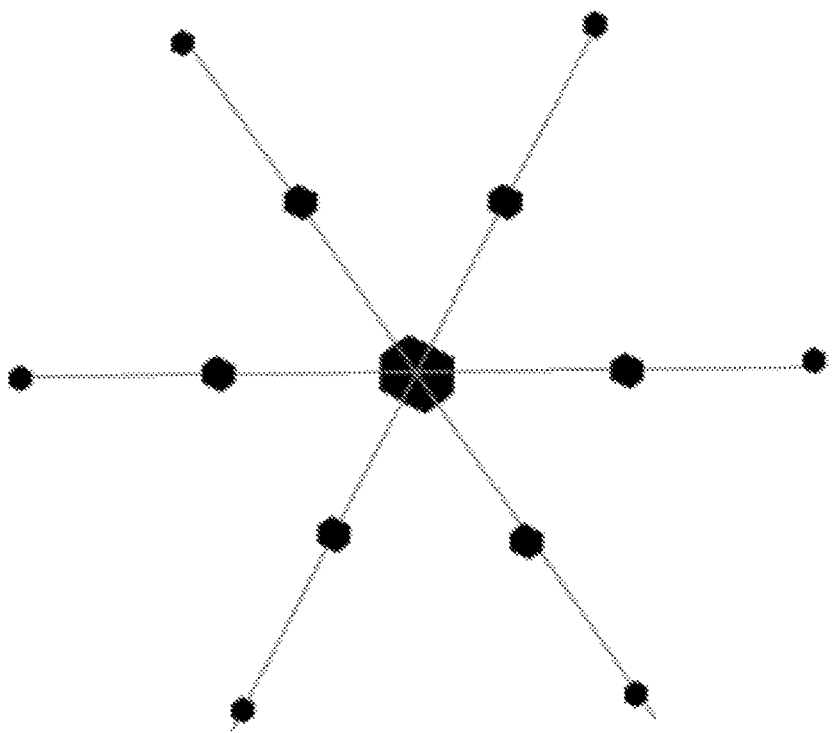
FIGS. 5A and 5B shows, left (5A), a pupil map and right a representation of the monochromatic PSF associated with the close-packed hexagon-segmented primary mirror shown on the left. The points on the right-hand side (5B) show the location of the monochromatic diffraction orders. The center is the image of the star and the first ring of points corresponds to the 1st order of the three diffraction gratings. The second ring of points corresponds to the 2nd order of the three diffraction gratings.
Figure 5A:
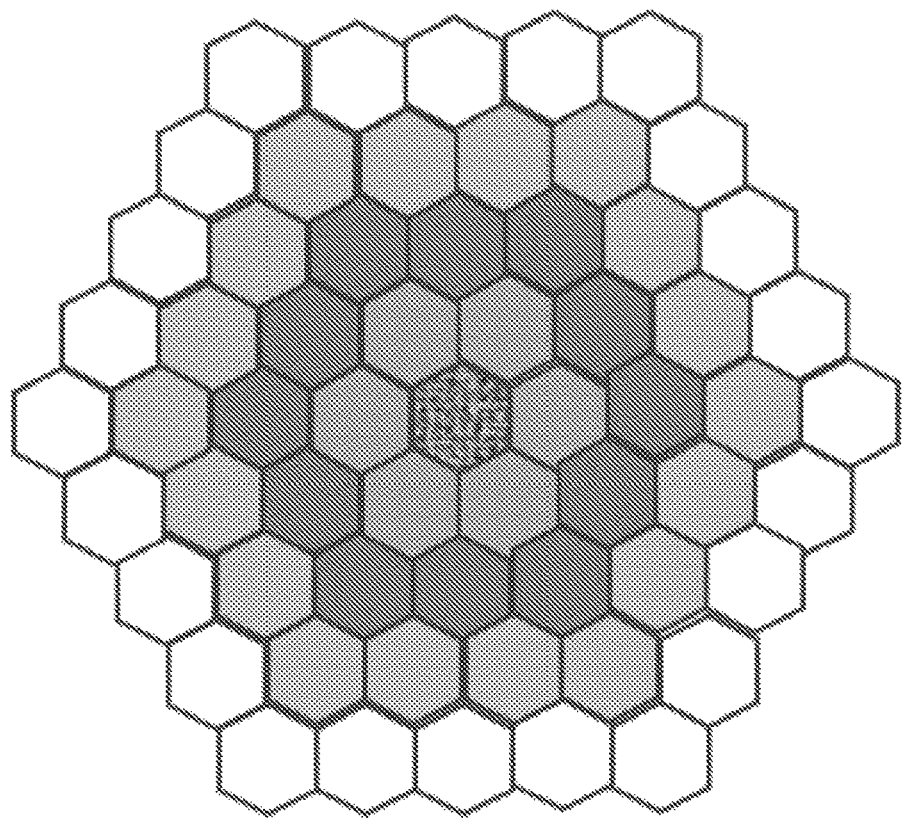

In FIG. 5 a Lyot coronagraph occulting mask would only block light from the zero-diffraction order, which contains light from the bright central star. But light from the higher diffraction orders n> or equal to 1 will scatter around the occulting mask to flood the detector plane. The occulting mask could be designed such that each order has its own mask, but that would block portions of the FOV where exoplanets might be found.

To determine if the diffraction images of the parent star will obscure exoplanets, the angular separation is calculated between zero order and the first order, n=1, for polychromatic light. Table 2 below shows the angular separation of the 450, 500, 550 nm wavelength monochromatic diffraction orders as a function of the face-to-face segment size.

TABLE 2

Figure 6:
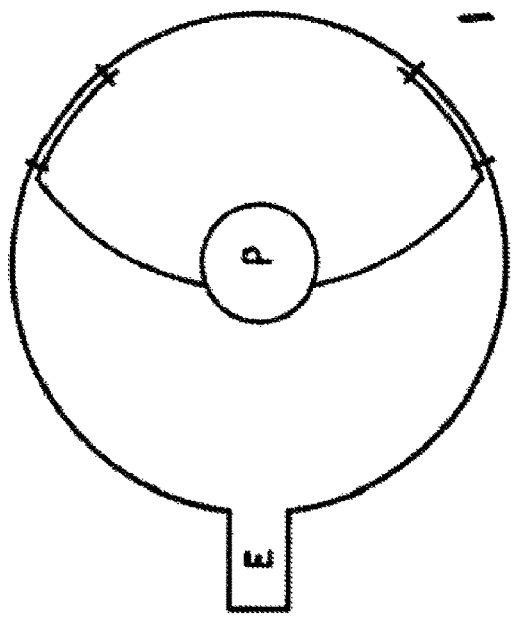
FIG. 6 shows an example four secondary support structures used for visual observation of planets.
Figure 6:
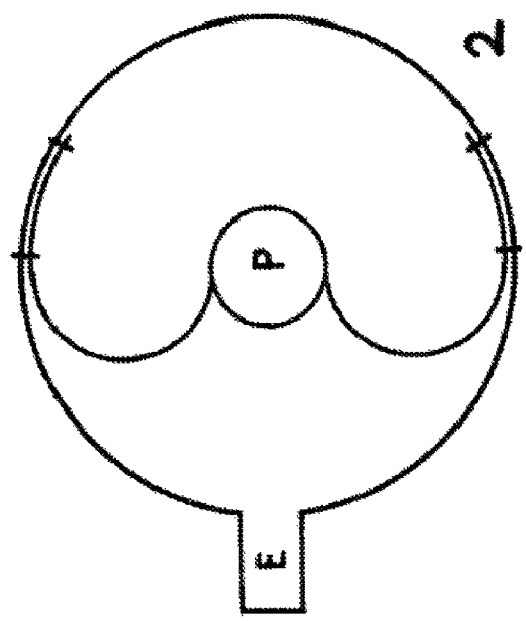
Figure 6:
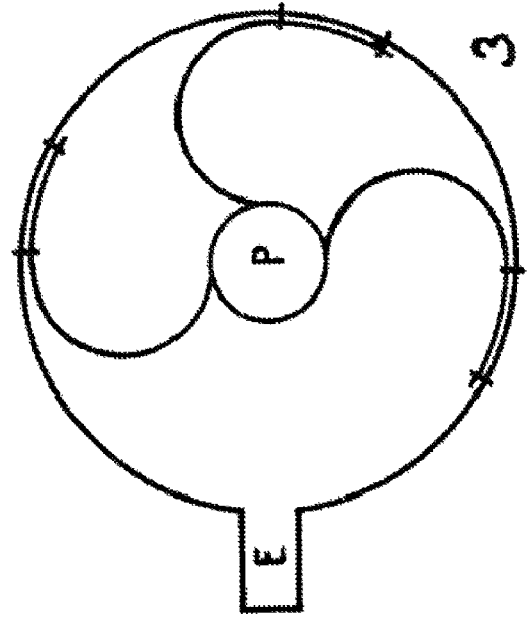
Figure 6:
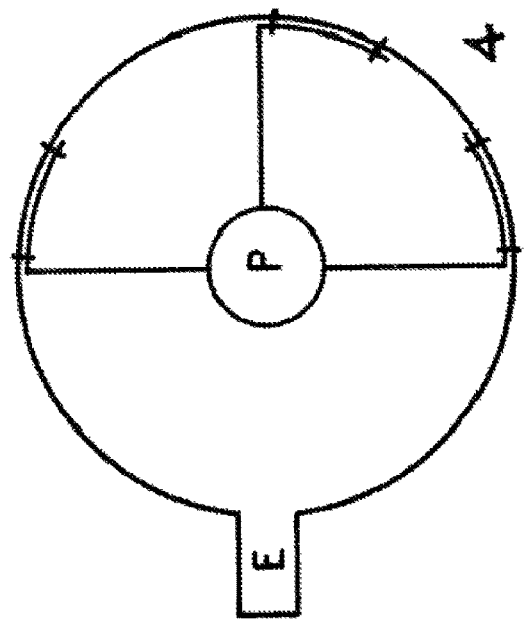
Figure 7:
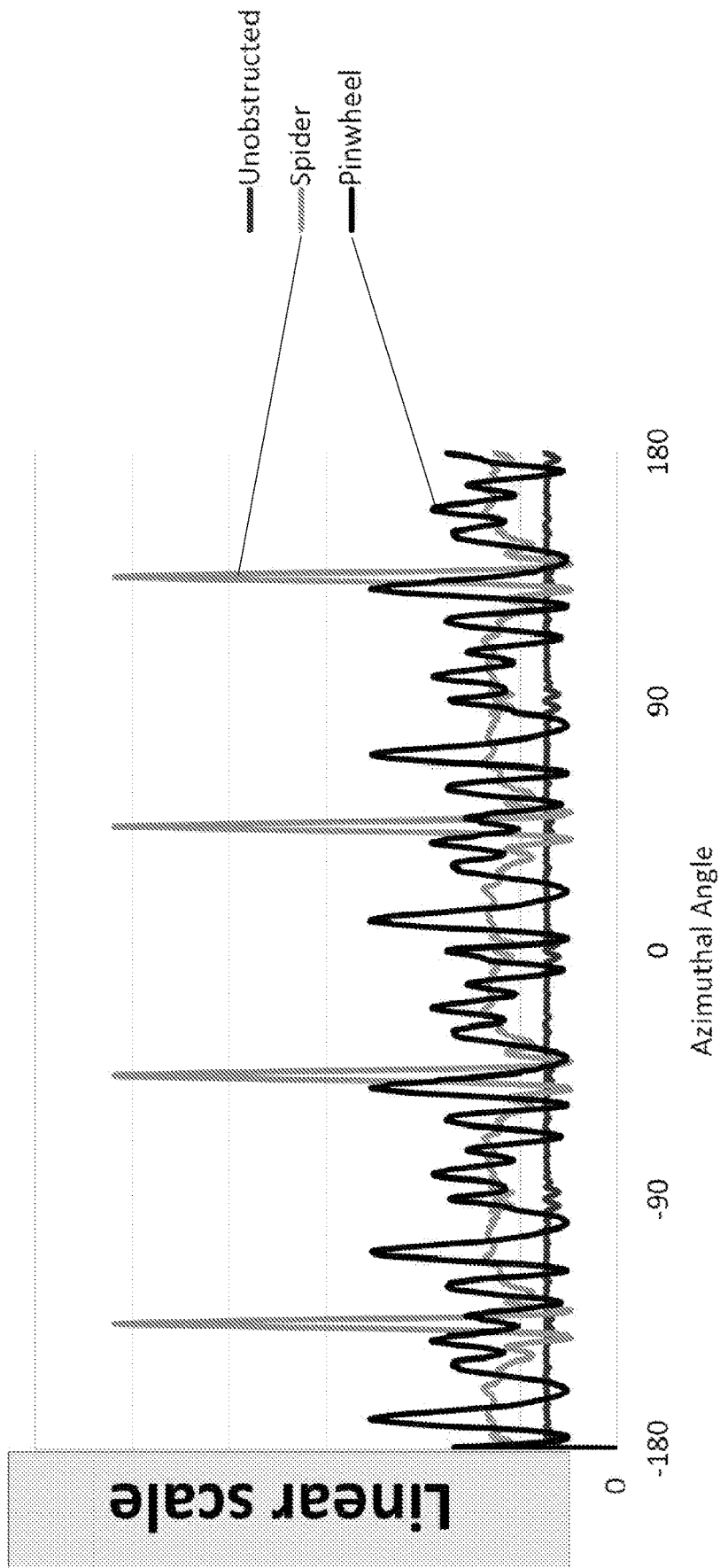
FIG. 7 shows an image plane linear-scale monochromatic intensity distribution from three 10-m diameter pupil topologies: unobstructed, spider and pinwheel are shown at field radius 0.75 arc-second for azimuth angles −180 to +180 degrees.

Angular separation of the diffraction orders for face-to-face segment sizes: 1, 2, 3, 4 meters. This applies to the diffraction orders shown in FIG. 6, above.

| Face-to Face segment size in meters | Angle for 450-nm masec | Angle for 500-nm masec | Angle for 550-nm masec |
|---|---|---|---|
| 1 | 93 | 103 | 113 |
| 2 | 47 | 52 | 57 |
| 3 | 31 | 34 | 38 |
| 4 | 23 | 26 | 28 |

Comparing the entries in Table 2 with the entries in Table 1 and see that the unwanted diffraction images of the parent star fall within the same FOV region as the exoplanets. Clearly there would be a significant advantage to the development of a straightforward, low absorption way to eliminate these diffraction orders. The pinwheel pupil provides that opportunity.

The PSF for a Polychromatic Star

Exoplanets are very faint thermal sources. If they are to be observed in monochromatic or narrow band light integration times become impossibly long. The HabEx coronagraph is planned to observe in 100 nm bandwidths. One of these bandwidths in 450 to 550 nm and those values are used to compute the diffraction angles shown in Table 2. The star image at n=1 for the 1-meter face-to-face segments is a colored radial streak or small spectrum with 450 nm light at 93 masec and 550 nm light at 113 masec. The 2-meter face-to-face segments is a colored radial streak or small spectrum with 450 nm light at 47 masec and 550 nm light at 57 masec. This continues to the 4-meter face-to-face segments which give a colored radial streak or small spectrum with 450 nm light at 23 masec and 550 nm light at 28 masec.

Isoplanatic Point Spread Function for Image Processing

The polychromatic PSF shown in FIG. 5 (right) is not linear shift invariant and therefore the optical system is not isoplanatic. Also, looking at FIG. 5, right, the PSF is not rotationally symmetric either. These two facts complicate digital image processing. In the present disclosure, a pupil segmentation or topology architecture may produce images from an emulated filled aperture telescope pupil even though the pupil is mechanically segmented. This promises to reduce significantly the effects of an anisoplanatic PSF and will make digital image processing more reliable and less uncertain.

Compensating for Hexagonal Segments

Technologies to compensate for the diffraction patterns produced by straight line gaps and straight-line support structures across primary mirrors of large telescopes has been an area of active study recently. None of these methods may be completely satisfactory, however, since light is absorbed in the process.

Curved Secondary Support Structures

As shown above the hexagonal segment architecture or pupil topology leads to unwanted diffraction noise in the system. It is good engineering practice to seek ways to eliminate or reduce "noise" at its source, rather than devise complicated and signal absorbing methods to compensate.

Manufacture of Curved-Sided Segments

The manufacture of curved-sided non-circular aspheric-surface segments may be similar to the manufacture of hexagonal-sided aspheric-surface segments, provided the radius of curvature of the sides are gentle. One challenge is maintaining the "global" optical surface figure for those regions near the "points" of each segment.

With a full-sized tool, one may use rapid material removal polish for the roundels, removing most of the volume between the "nearest sphere" and the off-axis aspheric form. Then shape the roundel into a curved sided segment and remove the remaining small volume of surface error with deterministic small tools. The curved-sided segment is then finely polished with deterministic tools as was done for the 18 hexagonal segments of the JWST primary mirror.

Pinwheel mirror segments may be made of a number of different materials. The pinwheel or structured-segmented pupil technology applies to both segments of mirrors that comprise a filled as well as an annular apertures.

Figure 8A:
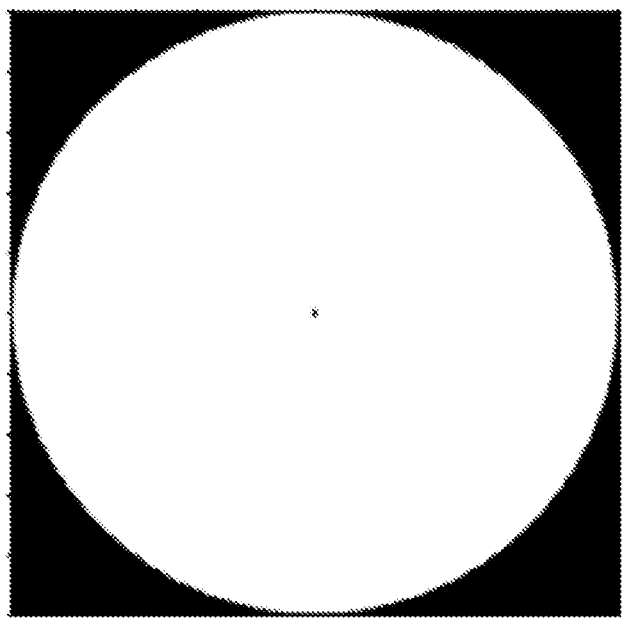
FIG. 8 shows a clear circular pupil function, corresponding rotationally symmetric PSF, and both the radial and azimuthal irradiance profiles of the PSF are illustrated for a telescope with an unobstructed circular aperture. Upper left shows an unobscured telescope pupil of 10-m aperture. Lower left shows the corresponding image plane point spread function which has point symmetry about the axis of the system which is centered. Upper right shows the irradiance, from 1 to $10^{-6}$ as a function of radius at the image plane out to 24 diffraction rings. Bottom right shows irradiance as a function of azimuth, or as astronomers call it position angle for 4 rings: 5th, 10th, 15th and 20th.
Figure 8A:
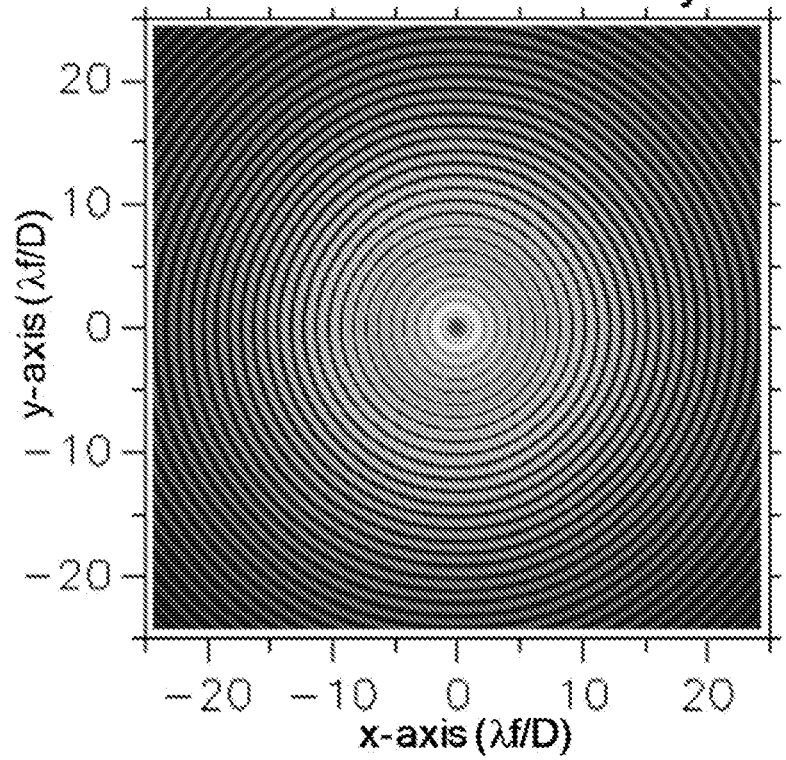
Figure 8B:
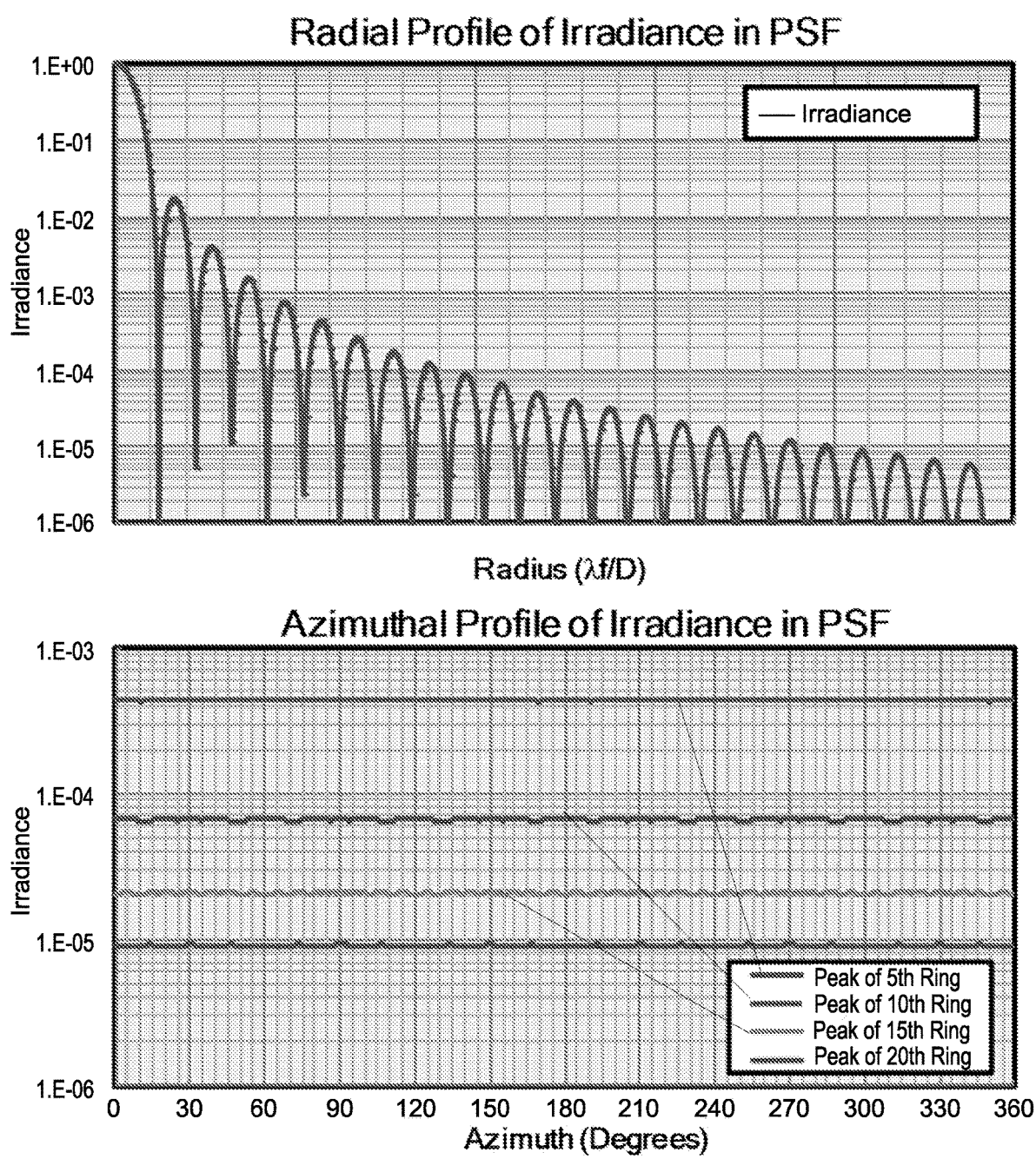

Diffraction Analysis of Curved Secondary Mirror Spiders and Segmented Mirror Gaps Modern computation tools (J. E. Harvey, R. G. Irvin and R. N. Pfisterer, "Modeling Physical Optics Phenomena by Complex Ray-tracing", Opt. Eng., 54(3), 035105 (2015). doi: 10.1117/1.OE.54.3.035105) may be used to perform detailed parametric numerical diffraction calculations to provide insight and demonstrate the extent to which discrete diffraction flares from straight secondary mirror spiders and segmented mirror gaps can be minimized or eliminated. As an example, FIG. 8 illustrates an unobscured circular pupil function, the corresponding PSF, and the radial and azimuthal irradiance profiles of that PSF.

Note that this ideal PSF consists of a central image core surrounded by the familiar concentric diffraction rings characteristic of a circular clear aperture. The peaks of the diffraction rings are monotonically decreasing and their spacing also slowly decreases monotonically, according to the well-known Airy pattern. (Eugene Hecht, Optics, 2nd Ed., Addison-Wesley Publishing Co., Reading, MA (1987). The azimuthal irradiance profiles are indicated at the peak of the 5th diffraction ring, as well as the 10th, 15th and 20th ring, thus spanning the habitable zone for exoplanets. The slight irregularity in the azimuthal profiles is the result of interpolation through a rectilinearly sampled data grid.

Figure 9A:
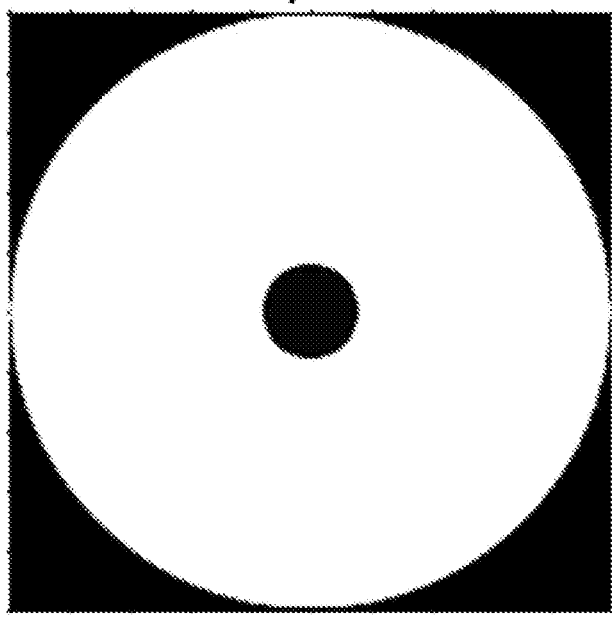
FIG. 9 shows an annular pupil function, corresponding rotationally symmetric PSF, and both the radial and azimuthal irradiance profiles of the PSF are illustrated for a telescope with an annular aperture. Upper left shows a telescope pupil of 10-m aperture obscured by a central hole to form an annulus. Lower left shows the corresponding image plane point spread function which has point symmetry about the axis of the system which is centered. Upper right shows the irradiance, from 1 to $10^{-6}$ as a function of radius at the image plane out to 24 diffraction rings. Bottom right shows the irradiance from $10^{-3}$ to $10^{-6}$ as a function of azimuth, or as astronomers call it position angle for 4 rings: 5th, 10th, 15th and 20th. Note that every 60 degrees of azimuth there is a diffraction ringing that would obscure exoplanets at those azimuths.
Figure 9A:
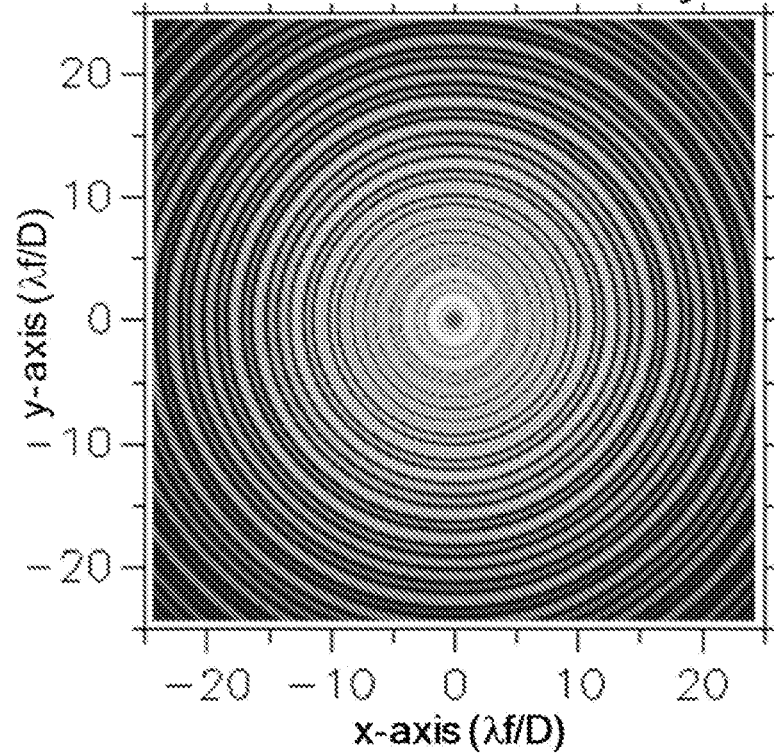
Figure 9B:
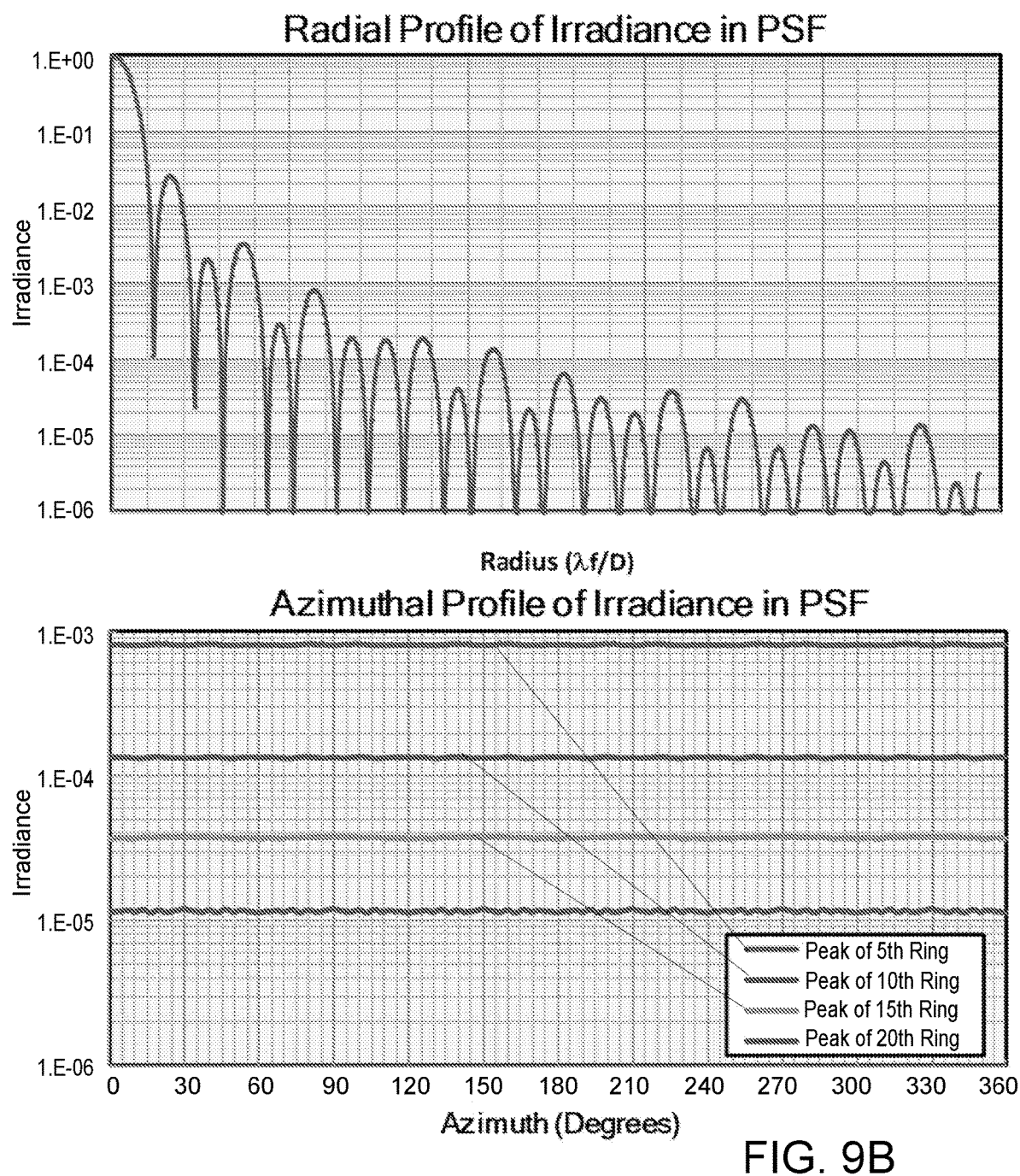
Figure 10:
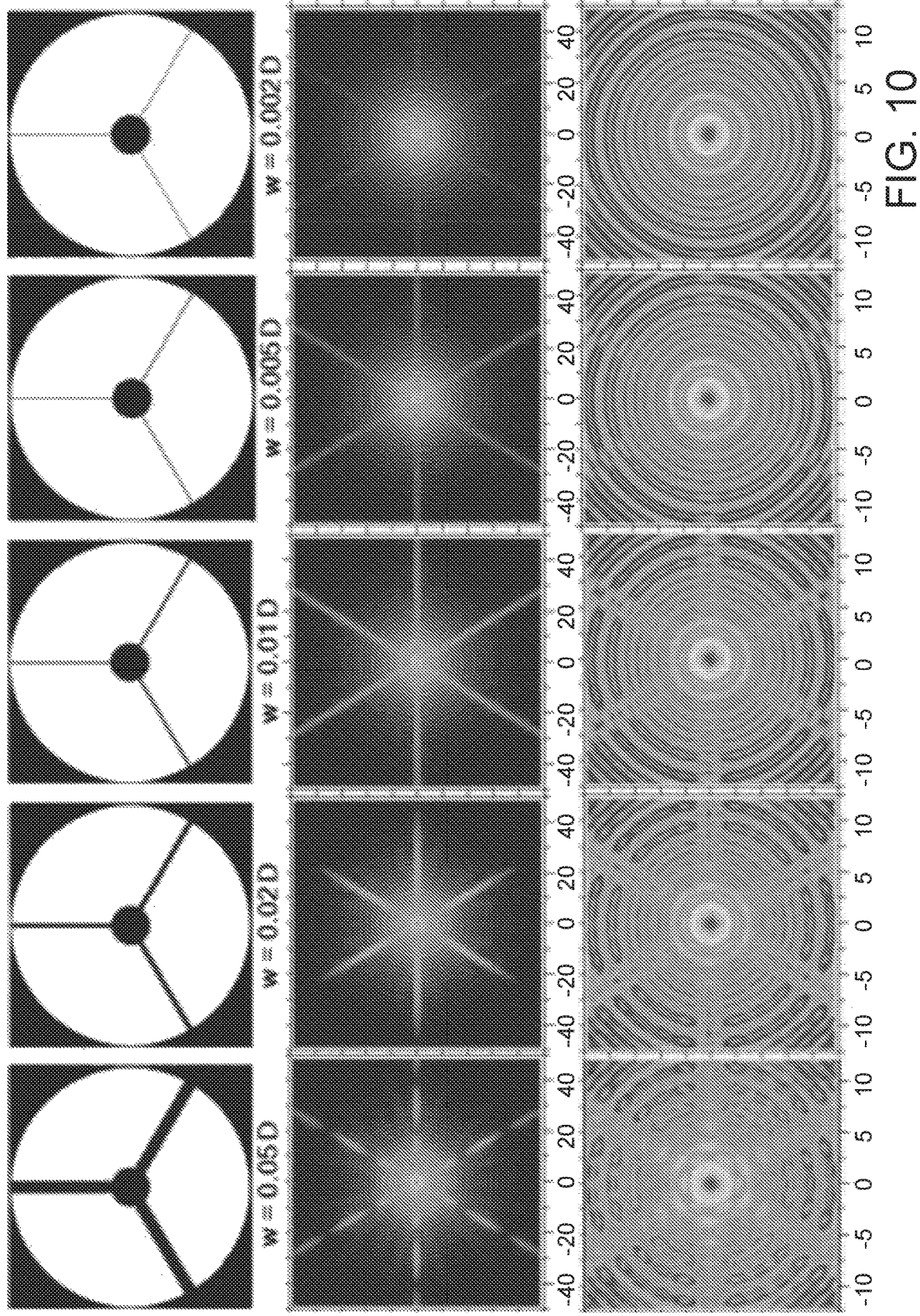
FIG. 10 shows a simulated diffraction effects for an annular aperture (ℰ=0.16) and three straight spiders of diminishing widths from 5% to 0.2% of the primary mirror diameter. Top row shows a set of five telescope aperture obscuring shadows from secondary support systems with decreasing shadow width produced by progressively narrow secondary support structures. The center row gives the corresponding point spread function (PSF) which show decreasing intensity of the diffraction spikes. The bottom row of figures show log based intensity maps of the intensity PSF's shown in the center row to reveal that even at widths as small as 0.002-D, the diffraction spikes still appear and will mask some exoplanets.

FIG. 9 illustrates the pupil function, PSF, and the radial and azimuthal irradiance profiles of the PSF for an annular pupil with a linear obscuration ratio of $\varepsilon=0.16$. Note that the central image core is still surrounded by the concentric diffraction rings; however, the peaks in the radial profile are no longer monotonically decreasing due the central obscuration. The azimuthal profiles are still uniform.

Figure 11:
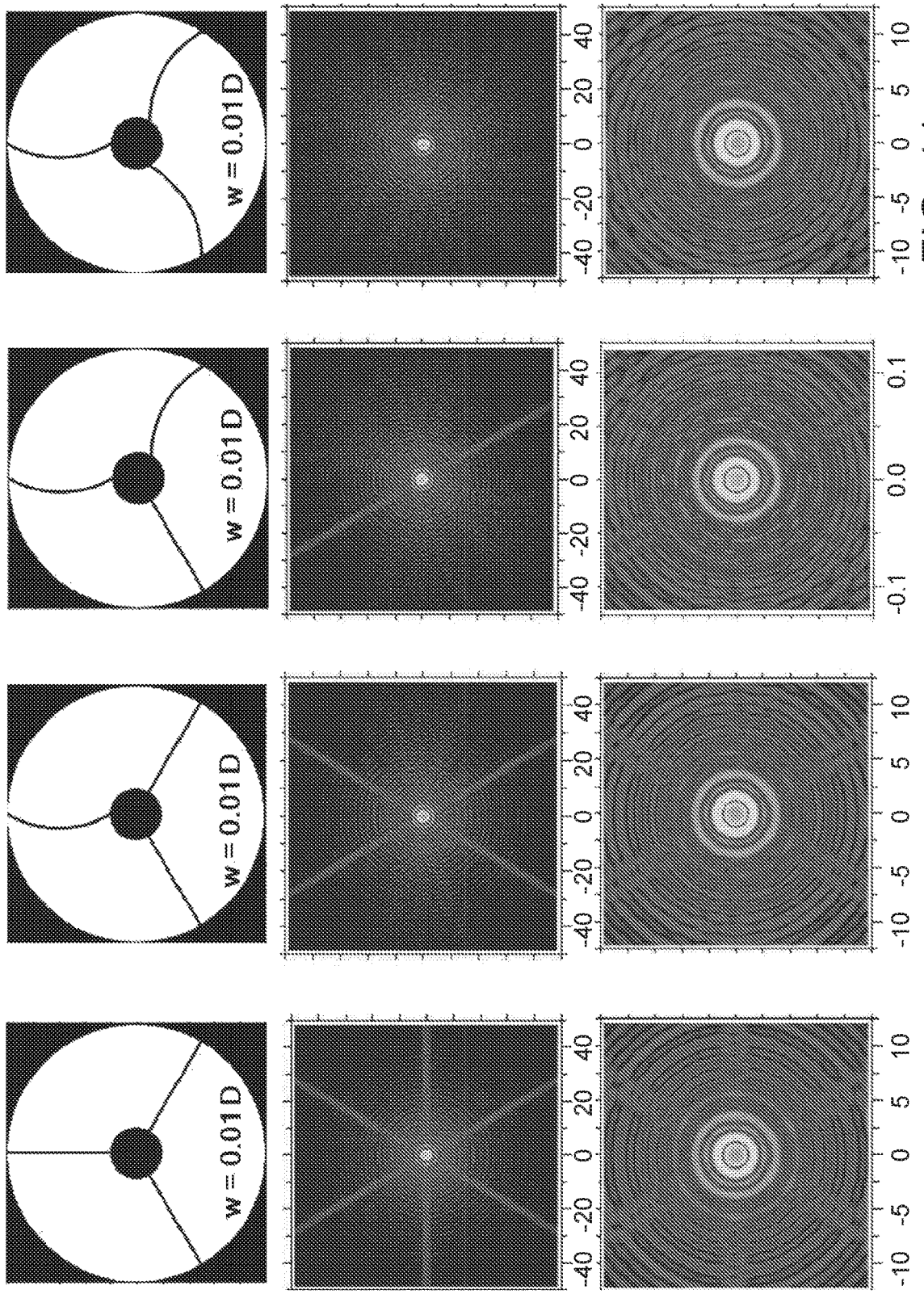
FIG. 11 shows a simulated diffraction effects for an annular aperture (ε=0.16) and three straight spiders (w=0.01D) as each spider is sequentially converted to an arc of a circle. Top row shows a set of five telescope aperture obscuring shadows from secondary support systems at the same obscuration width to the secondary structure (0.01-D), but now with changing curvatures on the structure. The center row gives the corresponding point spread function (PSF) which show decreasing intensity of the diffraction spikes. The bottom row of figures show log based intensity maps of the intensity PSF's shown in the center row to reveal that even at widths as small as 0.002-D, the diffraction spikes still appear and will mask some exoplanets.

In order to gain insight into the diffraction effects of straight secondary mirror spiders, FIG. 11 illustrates the pupil function for an annular aperture ($\varepsilon=0.16$) and three straight secondary mirror spiders whose width relative to the aperture diameter becomes smaller and smaller. Simulated diffraction PSFs are shown for each case out to approximately 50 diffraction rings (middle row) and out to approximately 12 diffraction rings (bottom row).

The amount of radiant power diffracted out of the image core is proportional to the area of the secondary mirror spiders, and since the struts have a rectangular cross-section, the individual diffraction flares are sine functions. As the width of the spider is reduced there is less and less radiant power in the flares and it is being diffracted out into larger and larger angles. This behavior is plainly visible in the middle row of simulated PSFs. In the bottom row, left column, the image core (diffraction pattern of the annulus) dominates the diffraction flares from the spiders for the 1st few rings, then the very pronounced interference effects of the diffraction flare and the image core dominates the remainder of the 1st 12 rings. As the width of the spiders decrease, these interference effects reduce until (for w=0.002 D) the corruption of the PSF by the diffraction flares is almost negligible.

Figure 12:
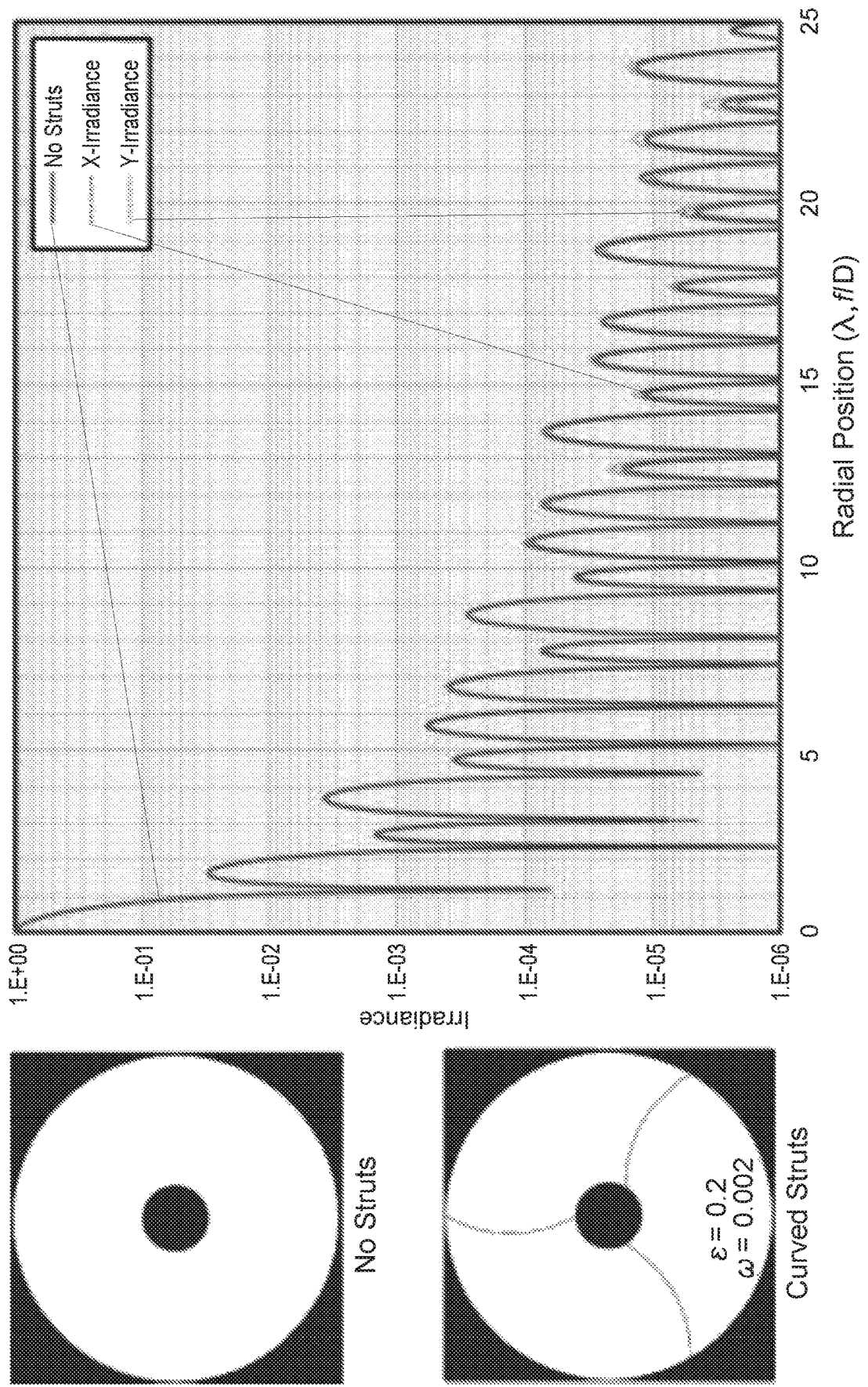
FIG. 12 shows x and y-axis radial irradiance profiles of the annular aperture with three curved spiders differ almost negligibly from each other and from that with no spiders. This figure shows how well an annular aperture that employs curved struts emulates an annular aperture with no obscurations. The curve on the right shows the image plane irradiance from 1 to $10^{-6}$ as a function of radial position. The solid line shows the diffraction pattern from the annular aperture with no struts and the dashed curve shows the diffraction pattern from the annular aperture that employs struts to support the telescope secondary mirror.

FIG. 12 illustrates the simulated diffraction effects for an annular aperture (C=0.16) and three straight spiders (w=0.01D) as each spider is sequentially converted to a 30° arc of a circle. Simulated PSFs are again shown both out to about 50 rings and out to about 12 rings. When the vertical spider is converted to a 30° arc of a circle, shown in the 2nd PSF of the 2nd row that the horizontal narrow diffraction flare has indeed disappeared; Likewise, when the remaining two straight spiders are converted to 30° arcs of a circle the corresponding discrete narrow diffraction flares disappear, but the remaining speckle pattern may be a detriment to exoplanet detection and identification. As an illustrative example, desirable results may be achieved by minimizing the size of the gaps.

Figure 13:
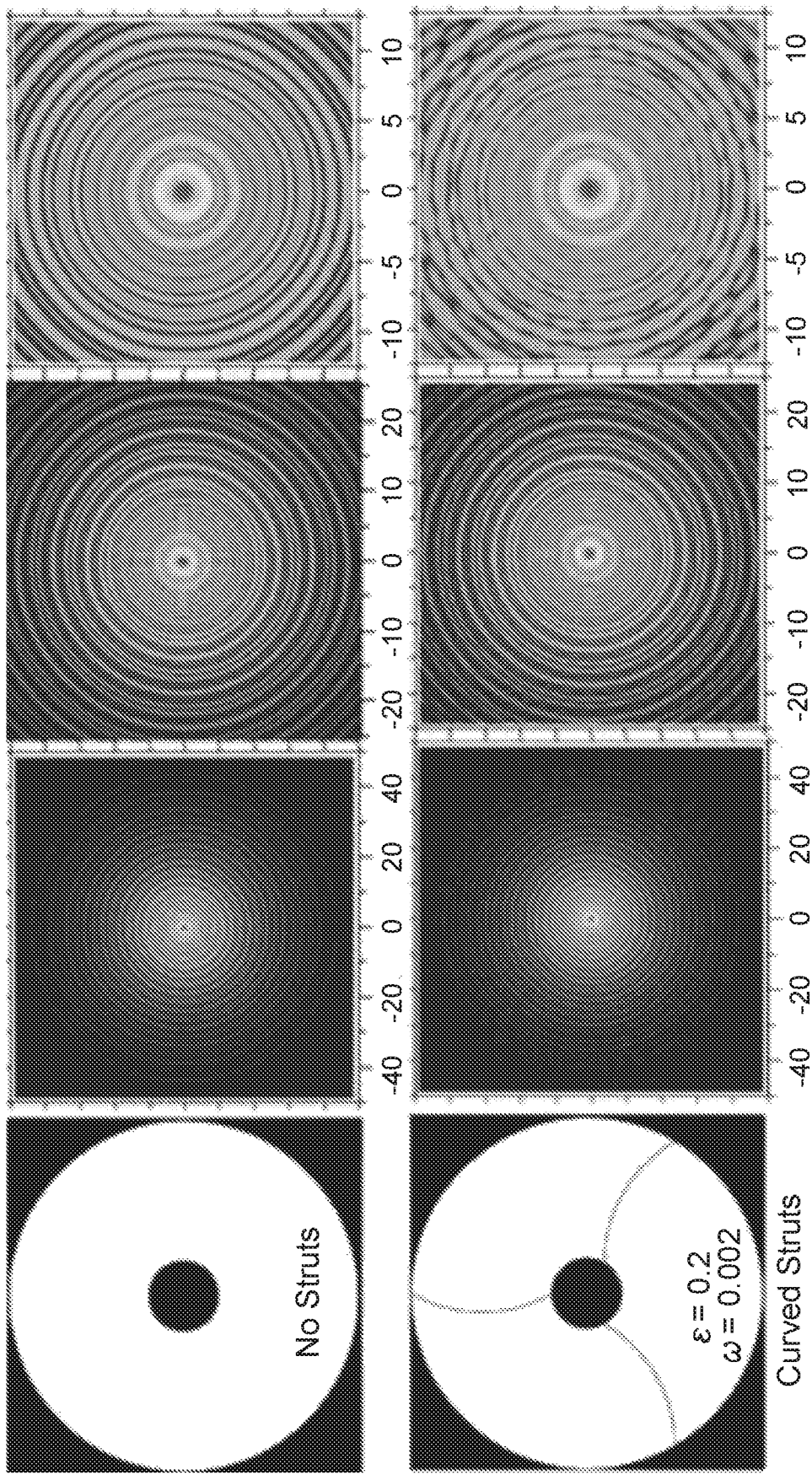
FIG. 13 shows a simulated diffraction effects for an annular aperture (ε=0.16) and three curved spiders (30° arc of circle) of relative width w=0.002D.
Figure 14A:
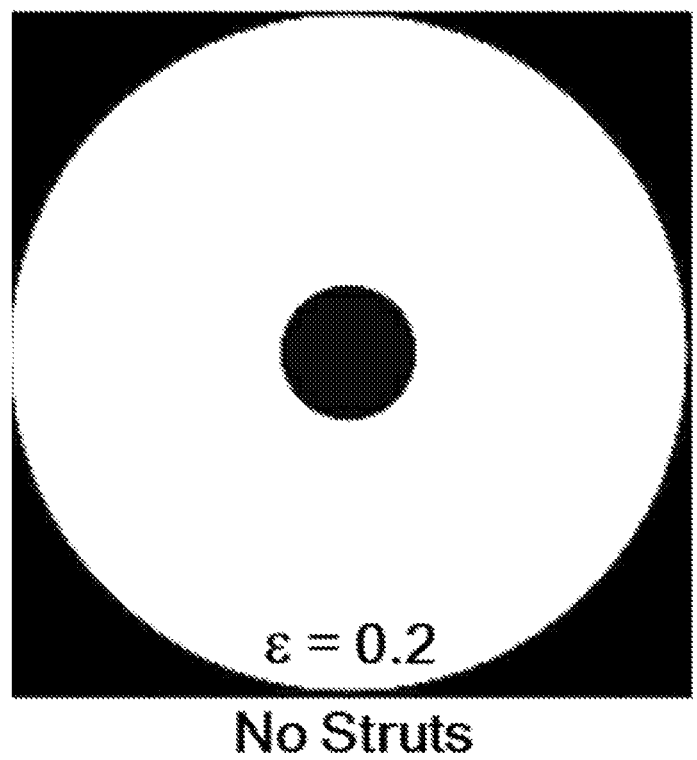
FIGS. 14A-14B show azimuthal irradiance profiles are indicated at the peak of the 5th diffraction ring, as well as the $10^{th}$, $15^{th}$ and $20^{th}$ ring, thus spanning the habitable zone for exoplanets. This figure shows how well an annular aperture that employs curved struts emulates an annular aperture with no obscurations. Right top shows a plot of irradiance from $10^{-3}$ to $10^{-6}$ for the 5th, 10th, 15th. and 20th diffraction ring for the aperture shown in the upper left which has no struts or no secondary support system. Lower left shows the plot on the same scale for the 5th, 10th, 15th. and 20th diffraction ring for the aperture shown in the lower left which has no struts or no secondary support system.
Figure 14A:
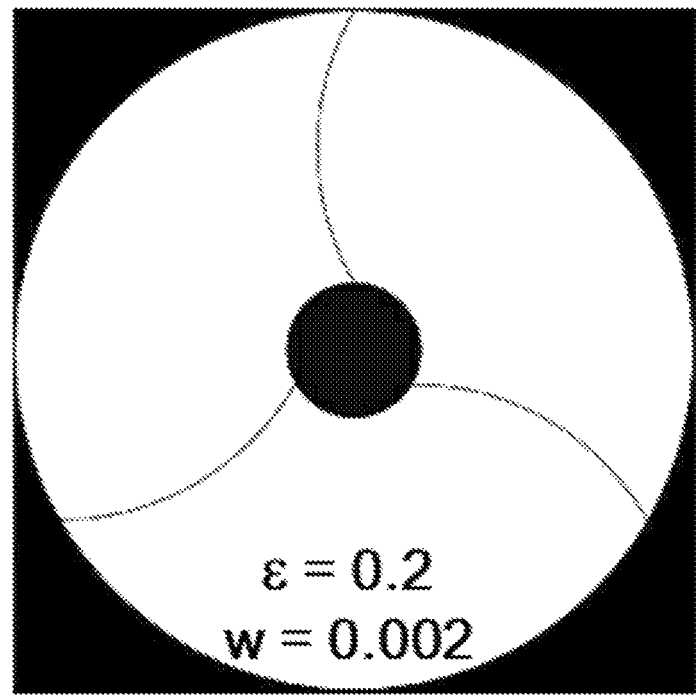
Figure 14B:
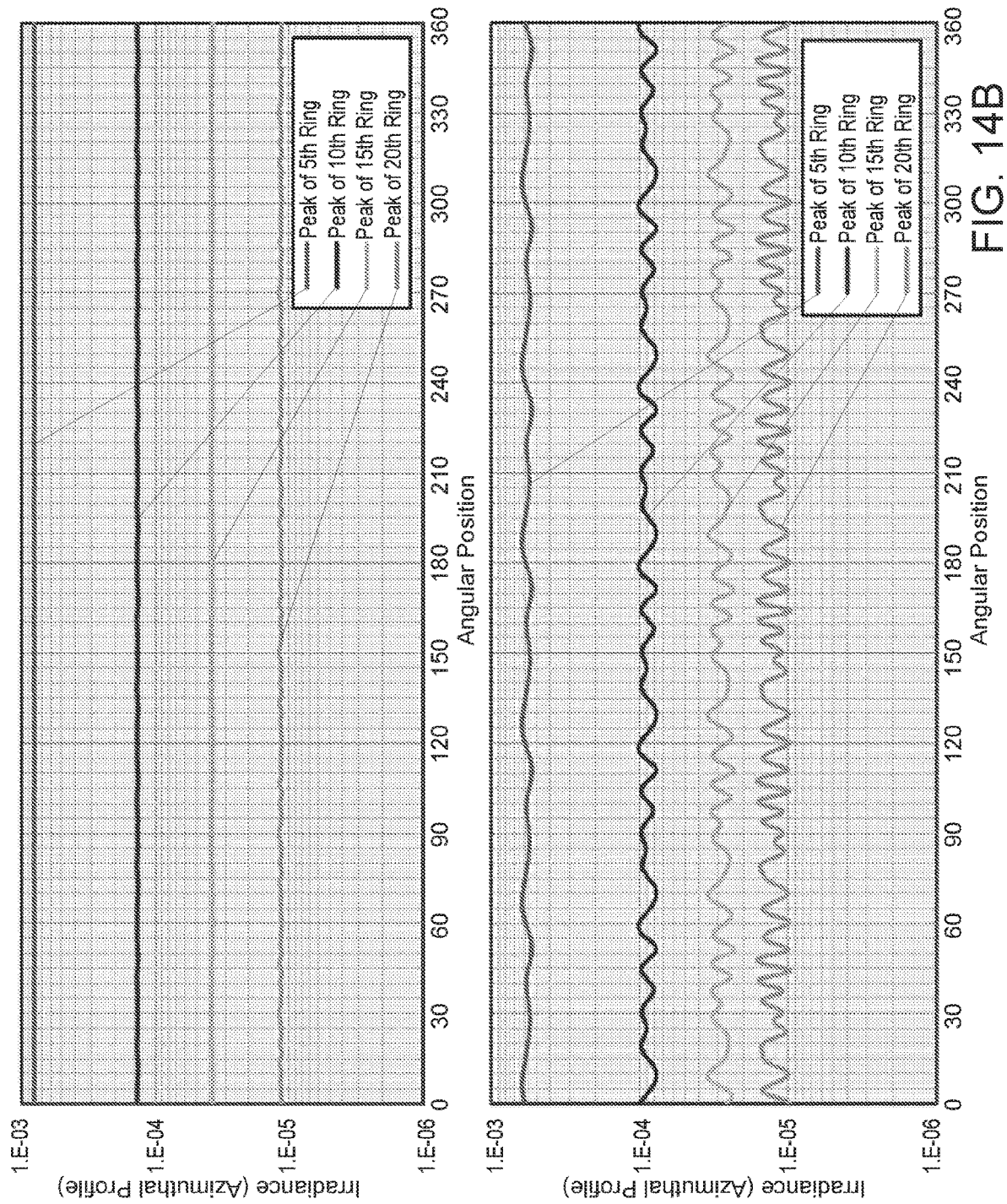

However, the last column of FIG. 11 indicated that when the spider width is narrowed to w=0.002D, the corruption of the PSF due to diffraction flares were essentially negligible. For a ten meter diameter segmented mirror, segment gaps 20 mm wide are reasonable. FIG. 13 to 15 thus show the image degradation (compared to an annular aperture with no spiders or gaps) due to three curved gaps whose relative width is w=0.002D.

The azimuthal irradiance profiles at the peak of the 5th, 10th, 15th and 20th rings (this range covers the habitable zone for most exoplanets) shown in FIG. 14 for the annular aperture with three curved radial obstructions consisting of 30° arcs of circles may have more irregularities than desirable.

The diffraction effects of telescope secondary mirror spiders were reviewed and provided a prescription for the elimination of discrete narrow diffraction flares by curved secondary mirror spiders, which calls for the elimination of straight lines in the pupil plane, using instead arcs of circles. And those arcs of circles, when added together in the pupil (by pure translation) must precisely constitute an exact semi-circle, or integer multiple thereof.

Image plane diffraction noise may be minimized by a fact of at least 10, a factor of at least 100, a factor of at least 200, by implementing curved spiders, as described herein compared to substantially similar mirrors comprising the same materials and structure, but with straight spiders or struts instead of the disclosed curved spider construction. Such disclosed structures disrupt the diffraction pattern and creating a nearly uniform background across the image plane having a minimized peak-to-peak variance in irradiance over angular position. Such minimization may be quantified by comparison to the substantially similar mirrors with straight spider/struct configuration.

Modern computation tools were then applied to perform detailed parametric numerical diffraction calculations that provide insight and demonstrate the extent to which discrete diffraction flares from straight secondary mirror spiders and segmented mirror gaps can be minimized or eliminated.

The present disclosure describes methods and systems that synthesize the optical performance of a high-angular resolution large aperture by combining mirror or lens segments having smaller apertures. The present disclosure controls diffraction from segment edges to provide the highest angular resolution possible given by the full, unobscured diameter of the aperture.

Many modifications and other embodiments of the present disclosures set forth herein will come to mind to one skilled in the art to which these present disclosures pertain having the benefit of the teachings presented in the foregoing descriptions and the associated drawings. Therefore, it is to be understood that the present disclosures are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed:

1. An optical system comprising:
   a segmented optical element comprising a plurality of curved-sided non-circular aspheric-surface segments disposed adjacent each other to define a pupil,
   wherein one or more of the plurality of curved-sided non-circular aspheric-surface segments comprises a reflective surface or optical power transmissive lens,
   wherein one or more of the plurality of curved-sided non-circular aspheric-surface segments comprises at least a pair of curved edges that nest with adjacent curved-sided non-circular aspheric-surface segments,
   wherein the optical element is arranged such that a curved gap is defined between adjacent nested curved-sided non-circular aspheric-surface segments, and wherein image plane diffraction noise is minimized by disrupting the diffraction pattern and creating a nearly uniform background across the image plane by use of the nested curved-sided non-circular aspheric-surface segments.

2. The system of claim 1, wherein the segmented optical element comprises a segmented phased primary mirror.

3. The system of claim 1, wherein the segmented optical element comprises a lens.

4. The system of claim 1, wherein the system is configured for use in a telescope, or an adaptive optics, or an imaging system, or a combination thereof.

5. The system of claim 1, wherein the segmented optical element comprises at least three nested curved-sided non-circular aspheric-surface segments.

6. The system of claim 1, wherein the curved gap has a width of 20 mm.

7. The system of claim 1, wherein the segmented optical element has a diameter of at least 10m.

8. The system of claim 1, wherein the curved gap has a width of 0.001D (diameter) of the segmented optical element.

9. The system of claim 1, wherein the curved gap has a width of 0.002D (diameter) of the segmented optical element.

10. The system of claim 1, wherein the pupil is generally annular.

11. A method of making the system of claim 1.

12. A method of using the system of claim 1.

13. A system comprising: a segmented optical element comprising a plurality of curved-sided non-circular aspheric-surface segments disposed adjacent each other to define a pupil, wherein each of the curved-sided non-circular aspheric-surface segments nests against adjacent curved-sided non-circular aspheric-surface segments across the segmented optical element, wherein image plane diffraction noise is minimized by disrupting the diffraction pattern and creating a nearly uniform background across the image plane by use of the nested curved-sided non-circular aspheric-surface segments.

14. The system of claim 13, wherein the segmented optical element comprises a segmented phased primary mirror or a lens.

15. The system of claim 13, wherein the system is configured for use in a telescope, or an adaptive optics, or an imaging system, or a combination thereof.

16. The system of claim 13, wherein the segmented optical element comprises at least three nested curved-sided non-circular aspheric-surface segments.

17. The system of claim 13, wherein the segmented optical element has a diameter of at least 10 m.

18. The system of claim 13, wherein the pupil is generally annular.

19. A method of making the system of claim 13.

20. A method of using the system of claim 13.

\* \* \* \* \*